United States Patent Office 2,797,375
Patented June 25, 1957

2,797,375

ALTERNATING-CURRENT MOTOR

Ernst F. W. Alexanderson, Schenectady, N. Y.

Application December 9, 1954, Serial No. 474,092

9 Claims. (Cl. 318—249)

This invention relates to alternating-current motors, and more particularly to alternating-current motors having performance characteristics similar to those of a direct-current motor.

Electric motors used in various applications, such as servo systems, should provide a high torque at standstill and low speeds. A direct-current motor provides a high starting torque but may be undesirable in certain applications because of its mechanical commutator. The induction motor is, therefore, often preferred in spite of its inferior starting characteristics.

An object of this invention is to provide a self-starting alternating-current motor whose performance is comparable to that of a D.-C. motor and which provides a high torque at standstill and at low speeds.

Another object is to provide an alternating-current motor as aforementioned which can be operated from a high frequency power supply.

A further object is to provide an A.-C. motor having the aforementioned characteristics which does not require a commutator.

Still a further object is to provide an A.-C. motor having the aforementioned characteristics which can be operated and reversed by remote control.

In accordance with this invention a self-starting alternating-current motor having operating characteristics comparable to those of a D.-C. motor is provided. It includes a polyphase stator winding connected in series with a rotor field winding. The series-connected stator and rotor windings are connected through rectifying means to a source of A.-C. power. The rectifying means are arranged to maintain a unidirectional current superimposed on an alternating current of power frequency flowing through the stator and rotor winding throughout the A.-C. cycle. Saturable reactors are used to govern the current flow through the stator windings. These reactors are controlled in response to voltages induced in the stator phase windings in response to the current of power frequency flowing through the rotor field winding. These voltages are related to, and define, the angular position of the rotor field winding.

Figure 1:
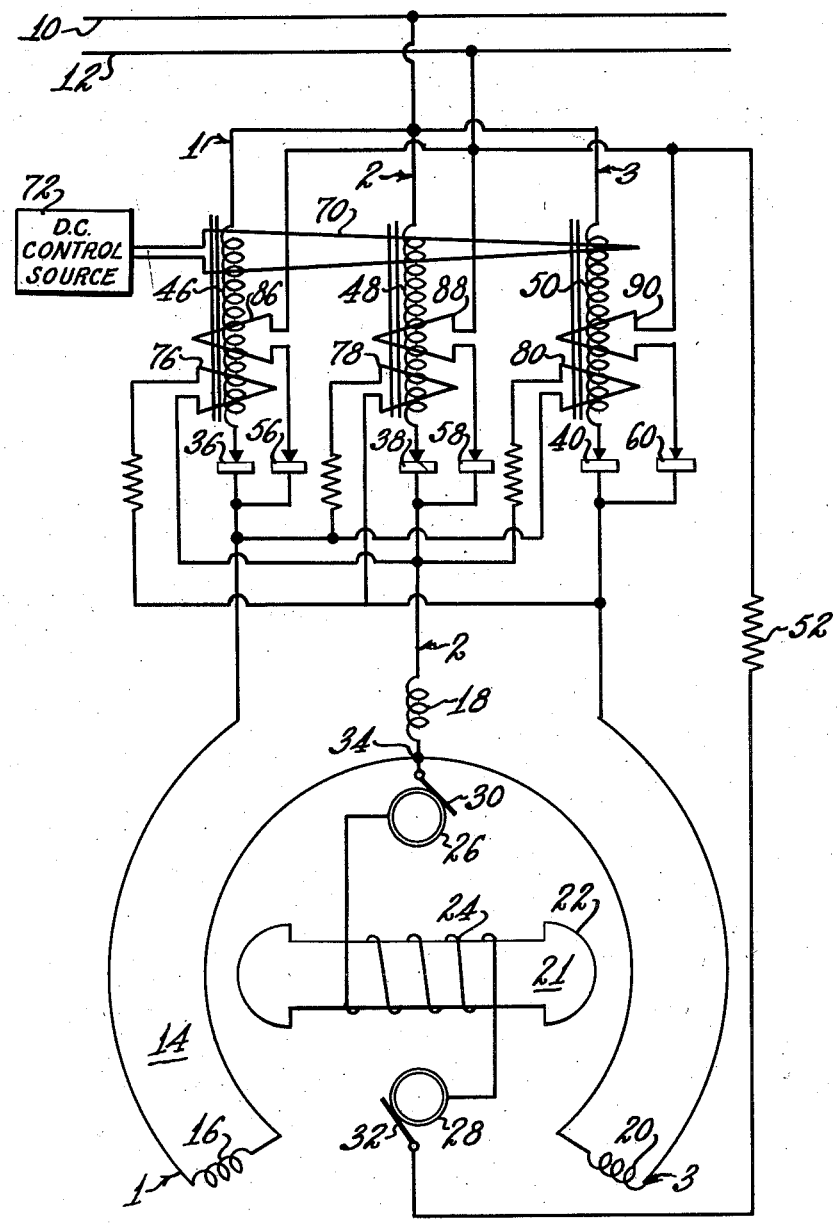
Figure 2:
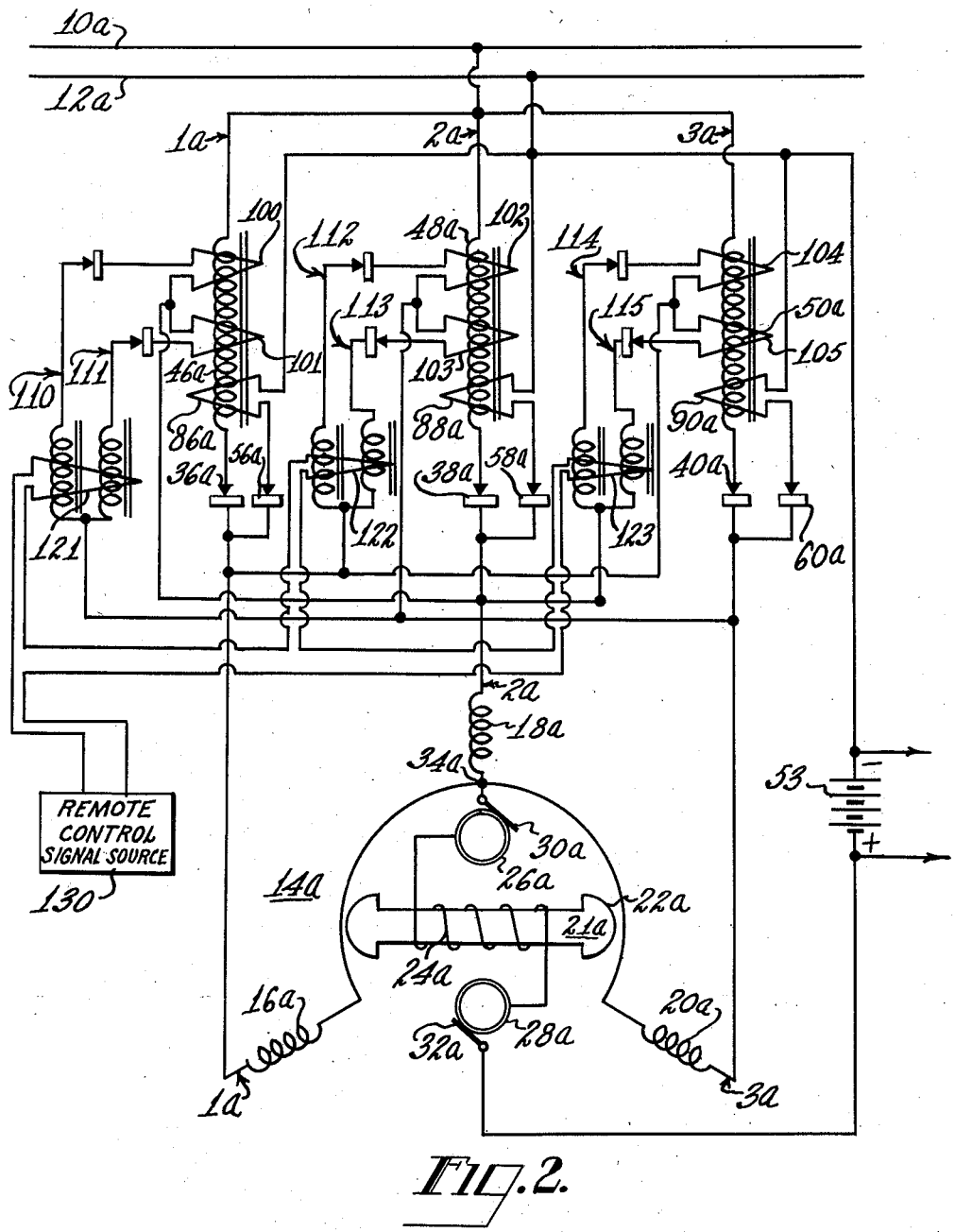

The novel features of the present invention will become apparent to one skilled in the art from a reading of the following description in conjunction with the accompanying drawings, in which:

Fig. 1 is a schematic diagram of a unidirectional rotating motor which is an embodiment of this invention, and Fig. 2 is a schematic diagram of a reversible motor which is another embodiment of this invention.

In Fig. 1 an illustrative A.-C. motor is shown operated from single phase A.-C. power lines or terminals 10 and 12. The motor has a three-phase stator winding 14 including stator phase windings 16, 18 and 20. A rotor 21 includes magnetic core 22 and rotor field winding 24. The rotor field winding 24 is connected through slip rings 26 and 28 and brushes 30 and 32 to the neutral 34 of stator phase windings 16, 18 and 20. The stator phase windings 16, 18 and 20 and rotor field winding 24 are thereby series-connected through the neutral 34.

The series-connected stator and rotor windings are connected to single phase power supply lines or terminals 10 and 12 through rectifying means in a manner to provide a unidirectional current of power frequency flowing through them. Each of the stator phase windings 16, 18 and 20 are accordingly connected through rectifiers 36, 38 and 40 respectively to single phase A.-C. line or terminal 10. These rectifiers may be, for example diodes of the semi-conductor type composed of germanium or silicon. Saturable reactors 46, 48 and 50 are connected between A.-C. power line or terminal 10 and the rectifiers of stator phase windings 16, 18 and 20 respectively. The stator phases for convenience may be referred to by general reference characters 1, 2 and 3 to refer to the phases including phase windings 16, 18 and 20 respectively. The saturable reactors in phases 1, 2 and 3 govern the current flow through the series-connected stator and rotor windings on the positive half-cycle provided by A.-C. line or terminal 10. The circuit from the rotor winding through slip ring 28 and brush 32 is completed back to the other A.-C. line or terminal 12 through resistor 52. The voltage drop across resistor 52 acts in a direction to prevent flow of undesired currents.

The stator phase windings and series-connected rotor are also connected to the other A.-C. line or terminal 12 through respective rectifiers 56, 58 and 60 so that the unidirectional current may be maintained flowing through the series-connected windings throughout the negative waves of the A.-C. power terminal 10. The circuit from the rotor winding through slip ring 28 and brush 32 is completed back to A.-C. line or terminal 12. Rectifiers 56, 58 and 60 may be similar to rectifiers 36, 38 and 40. Energy is stored in the stator phase windings 16, 18 and 20 and the rotor field winding 24 by current flowing therethrough during the positive half-cycle of the power wave provided at the A.-C. line terminal 10. This energy is released during the negative half-cycle of the power wave provided at the A.-C. line of terminal 10. Current flow during the positive half-cycle will, therefore, tend to be sustained during the negative half-cycles by the released energy whereby current flows in the same direction through the windings during both cycles of the power wave.

Three control windings are associated with each saturable reactor. A series-connected set of remote control windings is represented by winding 70. One winding of this series-connected set of windings is provided for each saturable reactor. A D.-C. control signal is provided to this set of windings from D.-C. control source 72.

Main control windings 76, 78 and 80 are provided for reactors 46, 48 and 50 respectively. Each of these main control windings is connected across a stator phase other than the phase whose current flow it is controlling. Main control winding 76, controlling saturable reactor 46 of phase 1, is connected across stator phase windings 18 and 20 respectively which are included in phases 2 and 3 respectively. Main control winding 78, controlling saturable reactors 48 of phase 2, is connected across stator windings 16 and 20 which are included in phases 1 and 3 respectively; and main control winding 80, controlling saturable reactor 50 in phase 3, is connected across stator phase windings 16 and 18 which are respectively included in phases 1 and 2.

The third set of control windings is the negative current feedback windings 86, 88 and 90 associated with reactors 46, 48 and 50 respectively. These negative feedback control windings are connected in series with rectifiers 56, 58 ad 60 respectively. They are provided to provide a negative premagnetization of the reactor during its non-conducting period which must be overcome by the control.

They provide a negative feedback which insures proportionality of control current and power current.

Since a unidirectional current is provided throughout the A.-C. power cycle, the current flowing through the series-connected stator and rotor windings is a direct current with a superimposed alternating current of power frequency. The direct-current component produces the rotor field. The A.-C. component in the rotor field winding induces transformation voltages in the various phases of the stator winding. These induced voltages vary in each stator phase from zero to a maximum and from positive to negative phase relation relative to the power frequency in accordance with the angular position of the rotor. The induced voltages in the stator phase winding, therefore, accurately define the position of the rotor. These voltages are used as signals for controlling the saturable reactors so that they cause current to flow through the stator phase windings in a distribution which causes rotation of the rotor. Each of the saturable reactors is associated with a rectifying diode. These associated components may be described, for the purpose of brevity of description, as a reactor-diode.

Reactor-diodes, as shown herein, can fire or cause current to flow only during the positive half-cycle. The control current, however, must be operative during the preceding negative half-cycle in order to prepare the reactor-diode for firing during the positive half-cycle. This control current during the negative half-cycle is provided through the rectifiers 56, 58 and 60 which shunt the reactor-diodes and carry current on the positive half-cycle of the A.-C. terminal 12. The main control windings 76, 78 and 80 are, therefore, enabled to derive their premagnetizing voltage or signal during the negative half-cycles of A.-C. power terminal 10.

Fig. 1 shows the rotor in an illustrative angular position. For this condition the current flows through phase 2 and passes horizontally through rotor winding 24 to magnetize a horizontal direct-current flux. The ampere-turns in the stator winding 18 of phase 2 are in optimum position for creating a torque against this flux. The reactor-diode must be controlled to shift the stator current cyclically from one phase to the next to maintain this torque-producing relationship as the rotor rotates.

The alternating component of power frequency which is superimposed upon the direct current in the rotor winding induces an A.-C. voltage in the stator windings. The phase and amplitude of this induced voltage in each of the stator windings defines the position of the rotor. The reactor-diodes are controlled in accordance with these induced voltages to produce rotation of the rotor.

In the angular position of the rotor shown in Fig. 1, the maximum of the induced A.-C. voltage appears between the terminals of phase windings 1 and 3. This signal is imposed on the reactor-diode in phase 2 by means of control winding 78. The control ampere-turns, thus applied, have a polarity which produces a positive premagnetization on negative half-cycles of A.-C. terminal 10. The reactor-diode in phase 2, therefore, fires at the beginning of a positive half-cycle and admits full current to stator phase winding 18 in phase 2. The saturable reactors in phase 1 and phase 3, however, are controlled by voltages induced across phases 3 to 2 and 1 to 2 respectively. These voltages or signals have an opposite polarity and, therefore, produce negative premagnetization for reactor-diodes in phases 1 and 3 on negative half-cycles of A.-C. power terminal 10. Reactor-diodes in phases 1 and 3, accordingly, act as high impedances and do not admit current. As the rotor rotates, the induced voltages across the stator phase windings vary cyclically. The control current, therefore, rises from zero to a maximum successively in each phase. It then falls to zero, reverses its phase and passes through a negative maximum. Current is, accordingly, admitted to the three phases in succession. This provides a varying distribution of ampere-turns in the stator which produces a torque in conjunction with the D.-C. field on the rotor.

When the motor is up to full speed, there are electromotive forces of power frequency generated in the stator windings. The voltage generated in an idle winding tends to force a current through the supplementary diodes 56, 58 and 60 in the direction of their conductivity. This current would complete its circuit through the idle stator phase winding and rotor winding back to the supplementary diode. If this current were not prevented from flowing, it would reduce the motor torque. The normal working current flowing through resistor 52 develops a voltage drop which together with the voltage drop in the field winding 24 opposes the voltage generated in the idle winding. This prevents the undesired current from flowing.

This illustrative motor has a high starting torque at standstill and at low speeds. This high starting torque is assured by the direct-current field in the rotor which locks in step with the rotating ampere-turns in the stator. This torque is comparable to the torque provided by a D.-C. series motor.

In Fig. 2 is shown a reversible A.-C. motor which has characteristics similar to the motor shown in Fig 1. Parts in Fig. 2 identical to parts in Fig. 1 are designated by the same reference characters followed by the suffix "a."

The motor is operated from single-phase A.-C. power lines 10a and 12a. It includes a three-phase stator winding 14a having phase windings 16a, 18a and 20a. It also has a rotor 21a and a rotor field winding 24a. The rotor field winding 24a is connected through slip rings 26a and 28a and brushes 30a and 32a to the neutral 34a of the stator phase windings. The stator phase windings 16a, 18a and 20a and rotor field winding 24a are series-connected through the neutral 34a. The series-connected stator and rotor windings are connected to single phase A.-C. power supply lines or terminals 10a and 12a through rectifying means. Each of the stator phase windings 16a, 18a and 20a are connected through rectifiers 36a, 38a and 40a respectively to single-phase A.-C. line or terminal 10a.

The stator phases for convenience may be referred to by general reference characters 1a, 2a and 3a which refer to the phases including windings 16a, 18a and 20a respectively. Saturable reactors 46a, 48a and 50a are connected between the A.-C. line or terminal 10a and the rectifier in phases 1a, 2a and 3a respectively. The saturable reactors in phases 1a, 2a and 3a govern the current flow during the positive half-cycle of A.-C. line or terminal 10a. The circuit from the rotor winding through slip ring 28a and brush 32a is completed back to the other A.-C. line or terminal 12a through a D.-C. power source 53 which may be, for example, a battery. The battery, for example, may provide 28 volts which may be used for auxiliary power. It acts in a similar manner to resistor 52 to prevent flow of undesired currents. An auxiliary power circuit is connected across the battery. The stator phase windings and series-connected rotor are connected directly to A.-C. line 12a through rectifiers 56a, 58a and 60a. The circuit back through collector rings and field winding is closed upon itself to A.-C. line 12a.

A pair of control windings are associated with each saturable reactor. Negative current feedback control windings 86a, 88a and 90a similar to those described in Fig. 1 are associated with each saturable reactor.

The main control winding, which governs current flow through each of the phases in a manner similar to that shown in Fig. 1, is made up of two control windings which act with opposite polarities. These control windings are designated by reference characters 100 to 105 inclusive. The even-numbered reference characters designate control windings having one polarity, and the odd-numbered reference characters designate windings having the opposite polarity. The pair of windings operatively associated with each of the saturable reactors are series connected. Control windings 100 and 101 are series-connected and operatively associated with saturable reactor 46a in phase 1. Control windings 102 and 103 are series-connected and operatively associated with saturable reactor 48a in phase 2; and control windings 104 and 105 are series-connected and operatively associated with saturable reactor 50a in phase 3.

Each series-connected pair of control windings is connected across a stator phase other than the phase through which it is controlling the current flow. The connections are made in a manner similar to the connections of the single main control windings shown in Fig. 1.

Control windings 100 and 101, controlling the current flow through phase 1a, are connected across stator phase windings 2a and 3a. Control windings 102 and 103, controlling the current flow through phase 2a, are connected across the stator phase windings in phases 1a and 3a; and control windings 104 and 105, controlling the current flow through phase 3a, are connected across the stator phase windings in phases 1a and 3a.

Each pair of series-connected control windings is further connected in series in a closed loop including two saturable reactors. These saturable reactors are arranged to have opposite senses or polarity. A rectifier is connected between each of these saturable reactors and a control winding. These rectifiers permit current to flow through one of these control windings when the polarity of the current flow agrees with the sense of the control winding. These saturable reactors and rectifiers may also be described as reactor-diodes.

Specifically in this embodiment, reactor-diodes 110 and 111 are connected to control the current flow, in the manner described, through control windings 100 and 101 respectively. Reactor-diodes 112 and 113 are connected to control the current flow through control windings 102 and 103 respectively; and reactor-diodes 114 and 115 are connected to control the current flow through control windings 104 and 105 respectively.

A control signal is provided to each set of reactor-diodes by a remote control winding. These remote control windings are designated by reference characters 121, 122 and 123. They are associated with the saturable reactors in phases 1a, 2a and 3a respectively. Remote control windings 121, 122 and 123 are series-connected to a source of a remote control signal 130. According to the signal provided, the motor is started or stopped and caused to run in either a forward or reverse direction.

When a positive remote control signal is provided, the control windings associated with each phase that have one polarity or sense are activated. The control windings having the other polarity or sense are deactivated. The activated set of control windings applies control pulses to the main reactor-diodes. The main reactor-diodes are thereby controlled to admit current in a sequence producing, for example, forward rotation. When a negative control signal is provided, the other set of control windings is activated. This allows current to be provided in the opposite sequence to the stator phase windings. This produces backward rotation of the motor.

The main reactor-diodes, controlling the current flow to the stator phase windings in Fig. 2, are controlled by an interrupted current of pulses instead of the full-wave alternating current controlling the motor shown in Fig. 1. The pulsating, or half-wave, control pulses, however, in Fig. 2 produce the same effect as the full-wave control pulses because only those pulses which coincide with the negative half-cycle are effective to control the saturable reactors. This is true, as was previously explained, because saturable reactors are controlled by premagnetization during the negative half-cycle, which prepares them to conduct during the following positive half-cycle.

The reversing control system described in Fig. 2 may also provide signals of neutral polarity so that the motor may be remotely stopped. The described control system is extremely sensitive since the current flow through stator phase windings is controlled through two stages of magnetic amplifiers. The control system described may be, therefore, termed as a two stage magnetic amplifier control or as a cascaded amplifier control.

The D.-C. power supply 53 and the auxiliary D.-C. circuit connected across it are connected in series with the rotor winding 24a to provide a counter voltage to oppose the electromotive force or voltage generated in the idle stator phase windings. It acts to prevent the undesired currents from flowing through the idle windings and causing a decrease in motor torque. The current is utilized, however, in charging battery 53 and also in the D.-C. circuit supplied in the battery.

What is claimed is:

1. An alternating-current motor comprising a polyphase stator winding, a rotor field winding, means connecting each phase of said stator winding in series with said rotor field winding, first rectifying means connecting each of said stator phase windings to one terminal of an A.-C. power supply, second rectifying means directly connecting said stator phase windings to the other terminal of said A.-C. power supply to maintain a unidirectional current of power frequency flowing through said stator phase windings and said rotor field winding throughout the A.-C. cycle, saturable reactor means connected between said source of A.-C. power and said first rectifying means to govern the current flow through said stator and rotor windings during one half-wave of said A.-C. cycle, and control means being operatively associated with each of said saturable reactors to cause a torque-producing current to flow through said stator in accordance with the angular position of said rotor winding, said control means being connected to derive a signal across stator phase windings in response to the voltage induced in said phase windings by said current of power frequency flowing through said rotor winding.

2. An alternating-current motor comprising a polyphase stator winding, a rotor field winding, means connecting each phase of said stator winding in series with said rotor field winding, first rectifying means connecting each of said stator phase windings to one terminal of an A.-C. power supply, second rectifying means directly connecting said stator phase windings to the other terminal of said A.-C. power supply to maintain a unidirectional current of power frequency flowing through said stator phase windings and said rotor field winding throughout the A.-C. cycle, saturable reactor means connected between said source of A.-C. power and said first rectifying means to govern the current flow through said stator and rotor windings during one half-wave of said A.-C. cycle, control means being operatively associated with each of said saturable reactors to cause a torque-producing current to flow through said stator in accordance with the angular position of said rotor winding, said control means being connected to derive a signal across stator phase windings other than the phase whose current flow it is controlling in response to the voltage induced in said phase windings by said current of power frequency flowing through said rotor winding, and potential generating means connected in series with said rotor field winding to develop a voltage drop to oppose undesired currents from flowing through said stator phase windings.

3. An alternating-current motor comprising a polyphase stator winding, a rotor field winding, means connecting each phase of said stator winding in series with said rotor field winding, first rectifying means connecting each of said stator phase windings to one terminal of an A.-C. power supply, second rectifying means directly connecting said stator phase windings to the other terminal of said A.-C. power supply to maintain a unidirectional current of power frequency flowing through said stator phase windings and said rotor field winding throughout the A.-C. cycle, saturable reactor means connected between said source of A.-C. power and said first rectifying means to govern the current flow through said stator and rotor windings during one half-wave of said A.-C. cycle, control means being operatively associated with each of said saturable reactors to cause a torque-producing current to flow through said stator in accordance with the angular position of said rotor winding, said control means being connected to derive a signal in response to the voltage induced in said phase windings by said current of power frequency flowing through said rotor winding, and additional control means being operatively associated with each of said saturable reactor means, said additional control means being connected in series with said second rectifying means.

4. An alternating-current motor comprising a polyphase stator winding, a rotor field winding, saturable reactors having load windings and control windings, a load winding of each of said saturable reactors connecting each phase of said stator winding to the same terminal of an A.-C. power supply, first rectifying means connected between each of said saturable reactors and said stator phase winding connected thereto, collector ring means connecting said rotor field winding between each of said stator phase windings and the other terminal of said single-phase A.-C. power supply, second rectifying means connecting each of said stator phase windings directly to said other terminal of said single-phase A.-C. power supply to maintain a unidirectional current of power frequency in said rotor winding throughout the A.-C. cycle, and a control winding of each of said reactors being connected across stator phase windings other than the phase whose current flow said control winding is regulating to cause current to flow through said stator phase windings in accordance with the angular position of said rotor winding.

5. An alternating-current motor comprising a polyphase stator winding, a rotor field winding, saturable reactors having load windings and control windings including a first control winding and a second control winding, a load winding of each of said saturable reactors connecting each phase of said stator winding to the same terminal of an A.-C. power supply, first rectifying means connected between each of said saturable reactors and said stator phase winding connected thereto to maintain a unidirectional current flowing through said stator phase windings, collector ring means connecting said rotor field winding between each of said stator phase windings and the other terminal of said single-phase A.-C. power supply, second rectifying means connecting each of said stator phase windings directly to said other terminal of said single-phase A.-C. power supply to maintain a unidirectional current of power frequency in said rotor winding throughout the A.-C. cycle, said first control winding of each of said reactors being connected across stator phase windings other than the phase whose current flow said control winding is regulating to cause current to flow through said stator phase windings in a distribution which causes said rotor to rotate, and said second control winding of each of said reactors being connected in series with each of said second rectifying means to aid in providing said current distribution through said stator phase windings.

6. An A.-C. motor comprising a polyphase stator winding, a rotor field winding, means connecting each phase of said stator winding in series with said field winding, reactor-diode means connected between one terminal of said A.-C. power supply and said phases of said stator winding to govern the current flow through said phases during the positive half of said A.-C. cycle, rectifying means connecting said phases directly to the other terminal of said A.-C. power supply to admit current to said phases during the negative half of said A.-C. cycle, and control means being operatively associated with each of said reactor-diodes to allow current to flow through said phases when a predetermined positive premagnetizing signal is provided to said control means during the preceding negative half-cycle, said control means being connected to said stator phase windings to derive a premagnetizing signal in response to the voltage induced by current flowing through said rotor winding during said preceding negative half-cycle.

7. An A.-C. motor comprising a polyphase stator winding, a rotor field winding, means connecting each phase of said stator winding in series with said field winding, reactor-diode means connected between one terminal of said A.-C. power supply and said phases of said stator winding to govern the current flow through said phases during the positive half of said A. C. cycle, rectifying means connecting said phases directly to the other terminal of said A.-C. power supply to admit current to said phases during the negative half of said A.-C. cycle, first control means being operatively associated with each of said reactor-diodes to allow current to flow through said phases when a positive premagnetizing signal is provided to said control means during the preceding negative half-cycle, said control means being connected to said stator windings to derive a premagnetizing signal in response to the voltage induced by current flowing through said rotor winding during said preceding negative half-cycle, and second control means being operatively associated with said reactor-diodes to provide a negative bias to said reactor-diode during said negative half-cycle, said second control means being connected in series with said rectifying means.

8. A reversible A.-C. motor comprising a polyphase stator winding, a rotor field winding, means connecting each phase of said stator winding in series with said rotor field winding, first rectifying means connecting each stator phase winding to one terminal of an A.-C. power supply, second rectifying means directly connecting said stator phase windings to the other terminal of A.-C. power supply, saturable reactor means connected between said source of A.-C. power and said first rectifying means to govern the current flow through said stator and rotor windings during one-half wave of said A.-C. cycle, control means of a predetermined polarity being operatively associated with each of said saturable reactors, control means of opposite polarity being operatively associated with each of said saturable reactors, the pairs of said control means associated with each of said reactors being connected to derive a signal across stator phase windings in accordance with the angular position of said rotor, and activating means being operatively associated with each of said pairs of control means to selectively energize one control means of each of said pairs to cause said reactors to admit current to said phases in predetermined sequences to optionally produce forward and reverse rotation of said rotor.

9. A reversible A.-C. motor comprising a polyphase stator winding, a rotor winding, means connecting each phase of said stator winding in series with said field winding, reactor-diode means connected between one terminal of said A.-C. power supply and said phases of said stator winding to govern the current flow through said phases during the positive half of said A.-C. cycle, rectifying means connecting said phases directly to the other terminal of said A.-C. power supply to admit current to said phases during the negative half of said A.-C. cycle, first control means being operatively associated with each of said reactor-diodes to cause current to flow through said phases in a preselected sequence to produce forward rotation, second control means being operatively associated with each of said reactor-diodes to cause current to flow through said phases in a preselected sequence to produce backward rotation, the pairs of said first and second control means being connected to derive a premagnetizing signal across said stator phase windings, and activating means being operatively associated with each of said pairs of first and second control means to selectively activate one control means of each of said pairs to produce rotation in a preselected direction.

No references cited.